US011578690B1

(12) United States Patent
Springer (10) Patent No.: US 11,578,690 B1
(45) Date of Patent: Feb. 14, 2023

(54) ENGINE HEATING CONTROL ASSEMBLY

(71) Applicant: Energy Insight Technologies LLC, Sewickley, PA (US)

(72) Inventor: Robert Springer, Aliquippa, PA (US)

(73) Assignee: Energy Insight Technologies LLC, Sewickley, PA (US)

( * ) Notice: Subject to any disclaimer, the term of this patent is extended or adjusted under 35 U.S.C. 154(b) by 268 days.

(21) Appl. No.: 16/434,623

(22) Filed: Jun. 7, 2019

Related U.S. Application Data (63) Continuation of application No. 15/718,057, filed on Sep. 28, 2017, now Pat. No. 10,359,019, which is a continuation of application No. 15/708,677, filed on Sep. 19, 2017, now abandoned.

(51) Int. Cl.
H05B 1/02 (2006.01)
F02N 19/02 (2010.01)

(52) U.S. Cl.
CPC .......... F02N 19/02 (2013.01); H05B 1/0236 (2013.01); F02N 2200/023 (2013.01)

(58) Field of Classification Search
CPC .......... B60H 1/2221; B60H 2001/2234; B60H 2001/2256; B60H 2001/2265; F01M 5/021; F01P 2025/48; F02D 41/064; F02N 19/02; F02N 2200/023; F02N 2200/122; F02N 2300/2011; H05B 1/0236
USPC ................................ 219/202–208, 490–494
See application file for complete search history.

(56) References Cited

U.S. PATENT DOCUMENTS

| | | | |
|---|---|---|---|
| 4,296,334 A | 10/1981 | Wong | |
| 4,337,389 A | 6/1982 | Bell | |
| 4,520,258 A | 5/1985 | Grohmann | |
| 4,681,070 A | 7/1987 | Kurihara et al. | |
| 5,129,376 A | 7/1992 | Parmley | |
| 5,222,661 A | 6/1993 | Wenhart | |
| 5,280,158 A | 1/1994 | Matava et al. | |
| 5,285,963 A | 2/1994 | Wakefield et al. | |
| 5,354,965 A | 10/1994 | Lee | |
| 5,397,550 A | 3/1995 | Marino, Jr. | |
| 5,703,342 A | 12/1997 | Hoffmann et al. | |
| 6,390,047 B1 | 5/2002 | Mitchell | |
| 10,359,019 B1 * | 7/2019 | Springer | F01M 5/021 |
| 10,650,621 B1 | 5/2020 | King et al. | |
| 2012/0150461 A1 | 6/2012 | Ohiwa et al. | |
| 2014/0114532 A1 * | 4/2014 | Choi | G08G 1/167 701/36 |

(Continued)

OTHER PUBLICATIONS

CONTROL-max Model-60, ELEproducts.com (2017), 4 pages.

*Primary Examiner* — Sang Y Paik
(74) *Attorney, Agent, or Firm* — K&L Gates LLP (57) ABSTRACT

A system for use with a block heater connected to an engine for pre-start heating of the engine. The system includes a power source, a relay assembly coupled to the power source, a temperature sensor, and a controller. The relay assembly, when closed, electrically connects the power source to the block heater, to thereby energize the block heater to heat the engine. The temperature sensor senses an ambient temperature indicative of a temperature of the engine. The controller is programmed to selectively activate the relay assembly to energize the block heater such that the engine coupled to the block heater is heated from the sensed ambient temperature to a target temperature at approximately a target time.

13 Claims, 8 Drawing Sheets

(56) References Cited

U.S. PATENT DOCUMENTS

2015/0129578 A1 5/2015 Aljabari
2016/0353921 A1 12/2016 Dodge

* cited by examiner

ENGINE HEATING CONTROL ASSEMBLY

PRIORITY

The present application is a continuation of U.S. patent application Ser. No. 15/718,057, filed Sep. 28, 2017, which is a continuation of U.S. patent application Ser. No. 15/708,677, filed Sep. 19, 2017, each of which is hereby incorporated by reference in its entirety.

BACKGROUND

When a diesel engine is below a certain threshold temperature, it can be difficult or impossible to start the engine until the engine is heated. When a vehicle is being used, the natural action of the engine generally maintains the engine at a sufficiently high temperature to operate; however, in typical daily use, vehicles are not utilized continuously for an entire 24-hour period. If a vehicle is left outside or otherwise exposed to sufficiently cold temperatures, the vehicle will not be usable after a certain period of time because the engine will be too cold to start. Therefore, many diesel engines are installed with an electrical block heater that is configured to pre-heat the cylinder block of the engine when activated. Many commercial trucking businesses, public transit bus systems, and other entities that own vehicles with diesel engines (especially those located in colder climates) activate the block heaters of their vehicles either every night or on nights that are expected to be especially cold so that the engines of their vehicles are pre-heated and ready to start the following morning. Having the block heaters running continuously all night generally wastes fuel or electricity though because the length of time required for a block heater to fully pre-heat an engine is less than the length of time that the block heaters are generally left on, even in exceptionally cold climates. The wasted fuel or electrical energy results in substantial excess costs, which only increases with the number of vehicles in the fleet that require pre-heating. Furthermore, in situations where employees are expected to activate the block heaters of the vehicles themselves when especially cold temperatures are imminent, unexpectedly cold temperatures or human error can result in substantial productivity losses when the vehicles' engines are too cold to start for the subsequent use.

While several devices have been made and used, it is believed that no one prior to the inventors has made or used the device described in the appended claims.

SUMMARY

In one general aspect, the present invention is directed to a system for use with a block heater connected to an engine for pre-start heating of the engine. The system comprises a power source; a relay assembly coupled to the power source; a temperature sensor; and a controller. The relay assembly, when closed, electrically connects the power source to the block heater, to thereby energize the block heater to heat the engine. The temperature sensor senses an ambient temperature indicative of a temperature of the engine. The controller is operably connected to each of the temperature sensor and the relay assembly. Further, the controller is programmed to: (1) determine a power of the block heater by applying a voltage to the block heater and detecting a current draw thereof resulting from the voltage; (2) determine the ambient temperature based on inputs from the temperature sensor; (3) determine a heating duration for the block heater, where the heating duration corresponds to a length of time required by the block heater to heat the engine from the ambient temperature to a target engine temperature, determined based on, in part, the power of the block heater; and (4) control the relay assembly to electrically connect the power source to the block heater to activate the block heater according to the heating duration and a target time, such that the engine reaches the target engine temperature at approximately the target time (e.g., +/−5 minutes or +/−2 minutes of the start time).

In another general aspect, the controller is programmed to: (1) detect when the block heater is connected to the relay assembly by transmitting a current through an electrical connection of the relay assembly and detecting when the electrical connection reads neutral; (2) determine the ambient temperature based on inputs from the temperature sensor; (3) determine a heating duration for the block heater, the heating duration corresponding to a length of time required by the block heater to heat the engine from the ambient temperature to a target temperature; and (4) control the relay assembly to electrically connect the power source to the block heater to activate the block heater according to the heating duration and a target time, such that the engine reaches the target temperature at approximately the target time.

In another general aspect, the present invention is directed to a method for controlling a block heater connected to an engine for pre-start heating of the engine. The method comprises the steps of: (1) determining a power of the block heater by applying a voltage to the block heater and detecting a current draw thereof resulting from the voltage; (2) determining an ambient temperature indicative of a temperature of the engine based on input from a temperature sensor; (3) determining a heating duration for the block heater, the heating duration corresponding to a length of time required by the block heater to heat the engine from the ambient temperature to a target temperature, determined based on, in part, the power of the block heater; and (4) controlling a relay assembly to electrically connect a power source to the block heater to activate the block heater according to the heating duration and a target time, such that the engine reaches the target temperature at approximately the target time.

FIGURES

Various embodiments of the present invention are described herein by way of example in conjunction with the following figures, wherein.

DESCRIPTION

Before explaining various aspects in detail, it should be noted that such aspects are not limited in their application or use to the details of construction and arrangement of parts illustrated in the accompanying drawings and description. The illustrative aspects may be implemented or incorporated in other aspects, variations and modifications, and may be practiced or carried out in various ways. For example, the systems and methods for controlling block heaters disclosed below are illustrative only and not meant to limit the scope or application thereof. Furthermore, unless otherwise indicated, the terms and expressions employed herein have been chosen for the purpose of describing the illustrative aspects for the convenience of the reader and are not to limit the scope thereof.

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims.

Figure 1A:
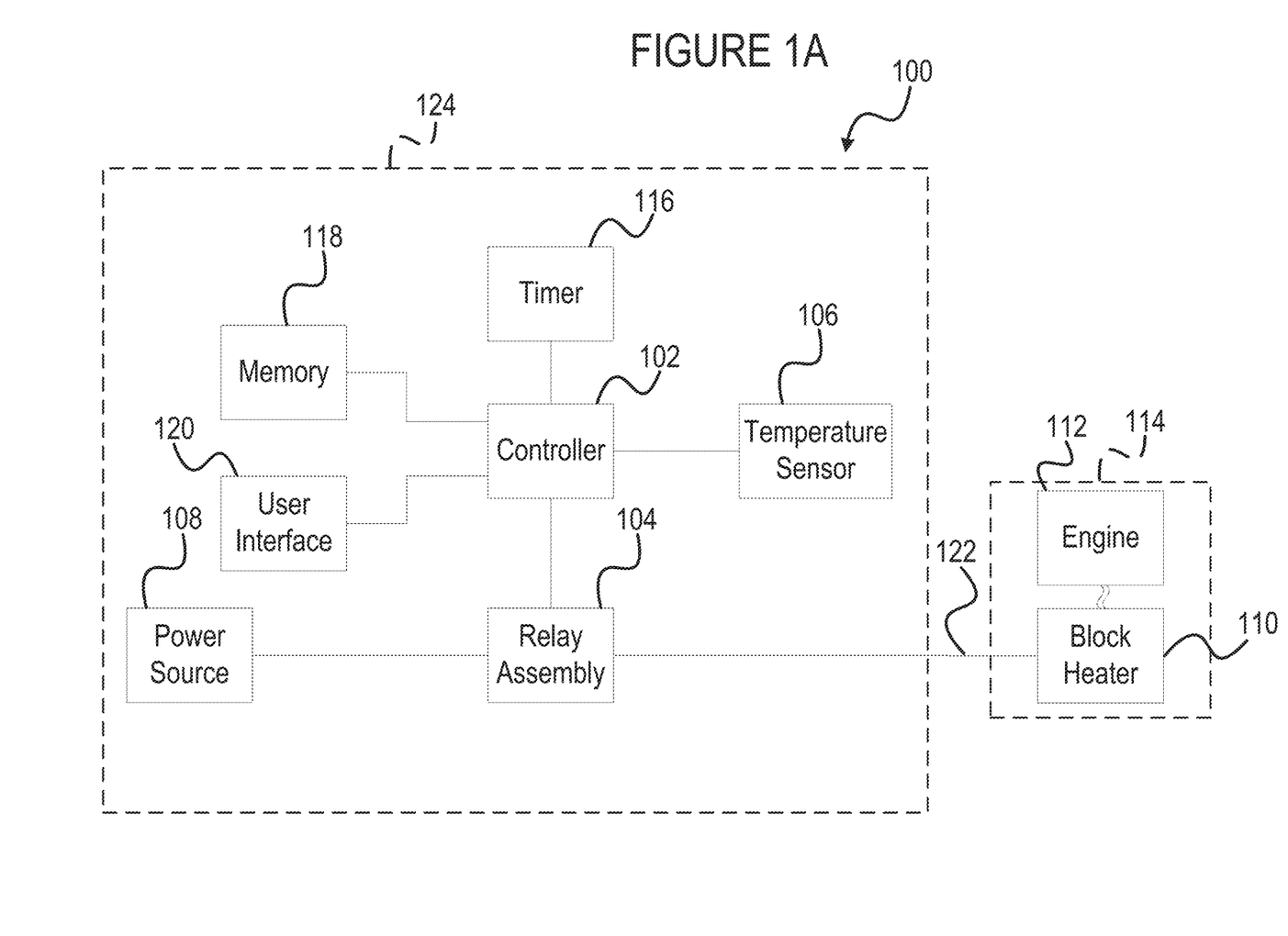
FIG. 1A is a block diagram of a system for controlling one or more block heaters, according to one or more aspects of this disclosure.

FIG. 1A is a block diagram of the system 100 for controlling one or more block heaters 110, according to one or more aspects of this disclosure. The system 100 includes a relay assembly 104 communicatively coupled to a power source 108 and a controller 102 coupled to the relay assembly 104 for controlling the operation of the relay assembly 104 with respect to the power source 108. The controller 102 can be programmed to control the activation of the relay assembly 104 to cause the relay assembly 104 to electrically connect the power source 108 to the block heater 110, such that the block heater 110 is energized to heat the engine 112 so that the engine 112 is heated to a target temperature at a target time. In one aspect, the controller 102 includes a processor operably connected to a memory 118 for executing instructions stored thereon. The relay assembly 104 is configured such that one or more electrical devices can be removably coupled to the relay assembly 104 via, e.g., an electrical connection 122, for receiving power from the power source 108 when the relay assembly 104 is activated (e.g., closed). In one aspect, the devices that are connectable to the relay assembly 104 include heaters, e.g., block heaters 110, which in turn can be utilized to heat engines 112, motors, transmissions, and other mechanical or electromechanical devices that require pre-heating to function in cold climates. Although the following disclosure is discussed in terms of heating the engines 112 of vehicles 114, this is merely for illustrative purposes and the system 100 described herein is not limited to any particular application. In operation, the controller 102 is configured to control the electrical connection between the power source 108 and the block heater 110 through the relay assembly 104 to selectively activate the block heater 110. Selective activation of the block heater 110 allows the system 100 to, e.g., pre-heat the engine 112 of the vehicle 114 during cold weather, without requiring that the block heater 110 be activated continuously during the period of time that the vehicle 114 is not in use, as will be described in further detail below.

The relay assembly 104 includes one or more relays or switches that are configured to selectively couple a device to the power source 108. The number of relays or switches (or outputs thereof, for individual relays or switches having multiple outputs) included in the relay assembly 104 can correspond to the maximum number of devices that are connectable to the relay assembly 104, as dictated by the electrical characteristics of the power source 108. The relay assembly 104 can include electromechanical relays (e.g., reed relays), solid state relays, or any other type of relay and combinations thereof.

The system 100 further includes a temperature sensor 106 that is communicatively coupled to the controller 102. In one aspect, the temperature sensor 106 is positioned to detect the ambient temperature in the environment surrounding the engine 112 or in the environment in which the engine 112 otherwise resides. The temperature sensor 106 includes, e.g., a circuit comprising a thermistor, thermocouple, or resistance temperature detector, wherein the output of the circuit is temperature-dependent. The state or output of the temperature sensor 106 corresponding to a temperature is continuously or periodically received by the controller 102 in order to track the temperature of the environment around the engine 112 over time. In one aspect, the rate at which the controller 102 determines the temperature via the temperature sensor 106 can be programmed by a user. In various aspects, the temperature sensor 106 can be integral to a housing unit 124 enclosing the controller 102 and/or relay assembly 104, separable from the housing unit 124 enclosing the controller 102 and/or relay assembly 104, or otherwise positionable remotely from the controller 102. In any case, the temperature sensor 106 is preferably located close enough to the engine 112 so that the temperature readings from the temperature sensor 106 are indicative of the engine's temperature.

The system 100 further includes a timer 116 that is communicatively coupled to the controller 102. The timer 116 is configured to output a time or a signal indicative thereof. In one aspect, the timer 116 includes, e.g., a clock generator. In another aspect, the timer 116 includes, e.g., a transceiver configured to poll a server generating a time signal. The state or output of the timer 116 corresponding to a time is continuously or periodically received by the controller 102 in order to, among other functions, allow the controller 102 to retrieve the current time, retrieve the day of the week, retrieve a system time or counter, and/or calculate a difference between the current time and a scheduled or target time. In one aspect, the target time may be, e.g., retrieved from the memory 118.

In various aspects, the system 100 can further include a user interface 120 for displaying information to a user and/or receiving input or commands from a user. In one aspect, the user interface 120 includes a GUI displayed on a display to which the controller 102 is communicatively coupled. The user interface 120 can allow a user to set a target time at which the user desires the engine 112 to be heated to a target temperature by the block heater 110, a schedule (e.g., particular days that the user wants the system 100 to control the activation of the block heater 110), a size of the engine 112, the target temperature to which the engine 112 is to be heated, and a variety of other options or variables associated with the operation of the system 100. The user interface 120 can be implemented with a touchscreen, a keypad or keyboard, a voice recognition system, or any other suitable user interface modality.

The various components of the system 100 can be contained within a single housing unit 124 to which a block heater 110 is connectable. Alternatively, the various components can be combined together and/or contained within separate housing units that are communicatively coupled together. For example, the relay assembly 104, controller 102, memory 118, and power source 108 can be contained within a housing unit 124 and the other components, such as the user interface 120, can be communicatively, operably, or electrically coupled to the housing unit 124 as a partially distributed system. For example, the user interface 120 could be web-based application running on a user's remote computer, which is in communication, via the Internet, with a network server that hosts the web application. As another example, the controller 102 for executing the various calculations described herein can be located remotely from the housing unit 124 containing the memory 118 and the relay 104 assembly, but communicatively coupled thereto via, e.g., the Internet, in order to offload the communications from the housing unit 124. The network server can be in communication with the controller 102, via wired or wireless links, so that user inputs via the web interface can be downloaded to the controller 102. As such, the unit 124 may include a WiFi circuit that communicatively connects the unit 124 to a network access point (not shown) to connect the unit 124 to the Internet; or the unit 124 could have a wired Internet connection. As yet another alternative, the system 100 can be completely distributed such that the components are positioned remotely from each other and are communicatively, operably, or electrically coupled, as appropriate.

Figure 1B:
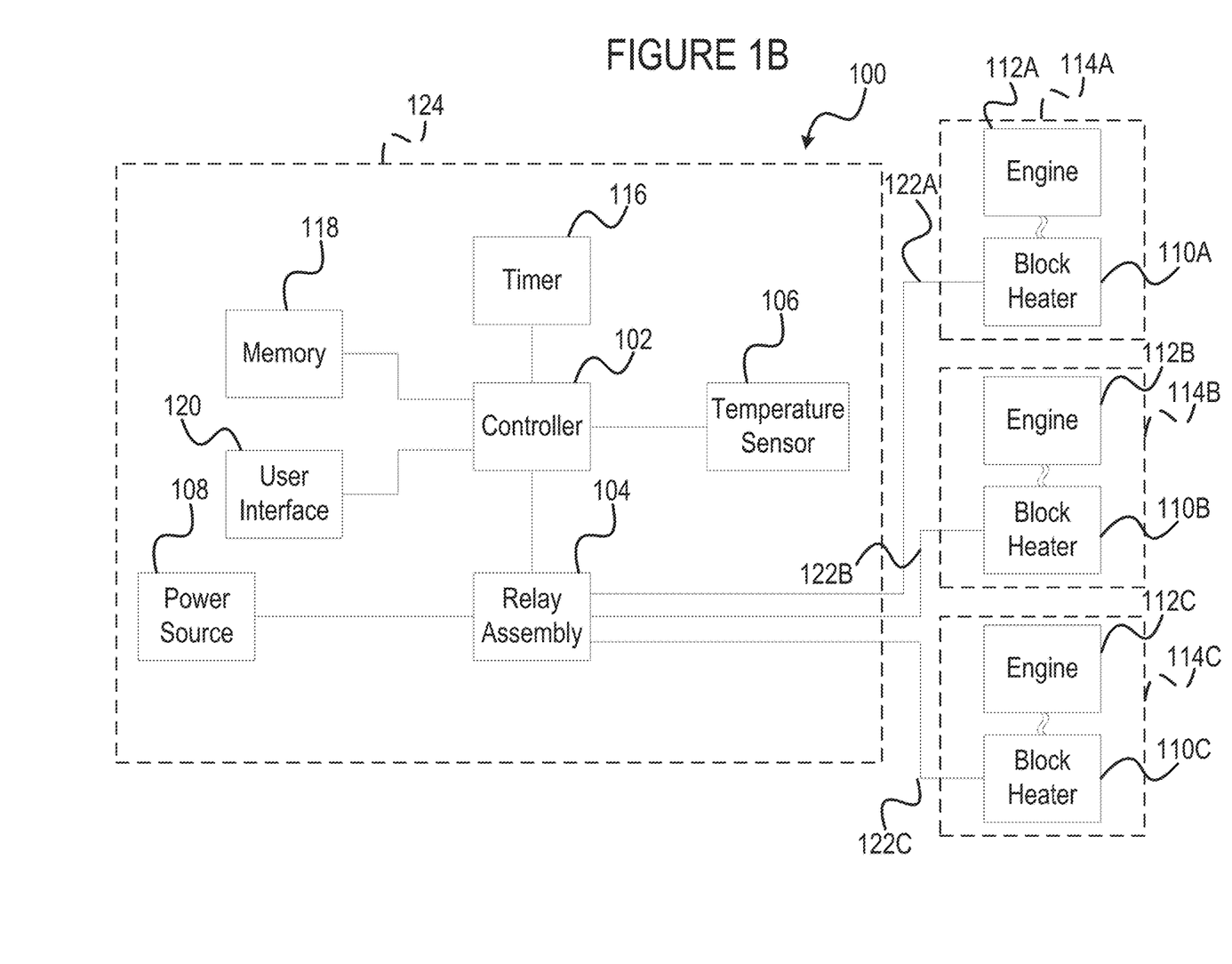
FIG. 1B is a block diagram of the system of FIG. 1A with multiple block heaters connected thereto, according to one or more aspects of this disclosure.

FIG. 1B is a block diagram of the system 100 of FIG. 1A with multiple block heaters 110A, 110B, 110C connected thereto, according to one or more aspects of this disclosure. The relay assembly 104 can be configured to have a plurality of block heaters 110A, 110B, 110C connected to it simultaneously. Each of the block heaters 110A, 110B, 110C corresponds to a separate vehicle 114A, 114B, 114C and each heats a corresponding engine 112A, 112B, 112C thereof. In such aspects, the relay assembly 104 includes a number of output ports or stations that are each able to receive an electrical connection 122A, 122B, 122C from each of the block heaters 110A, 110B, 110C. Although FIG. 1B depicts three block heaters 110A, 110B, 110C, the relay assembly 104 may be configured to receive any number of block heaters 110A, 110B, 110C, as limited by the structural or electrical characteristics of the power source 108. When multiple block heaters 110A, 110B, 110C are connected to the relay assembly 104, the controller 102 independently monitors the start time associated with each of the vehicles 114A, 114B, 114C and selectively controls each of the block heaters 110A, 110B, 110C accordingly. In other words, although the functions and processes below are discussed in terms of a single block heater 110A, 110B, 110C, the controller 102 can nonetheless be executing the processes with respect to each of the vehicles 114A, 114B, 114C and/or block heaters 110A, 110B, 110C simultaneously or in parallel. In some aspects, the relay assembly 104 includes a plurality of relays or switches that are each individually connectable to one of the block heaters 110A, 110B, 110C. In these aspects, the controller 102 selectively controls each of the individual relays or switches making up the relay assembly 104 in order to selectively energize the block heaters 110A, 110B, 110C.

Figure 2A:
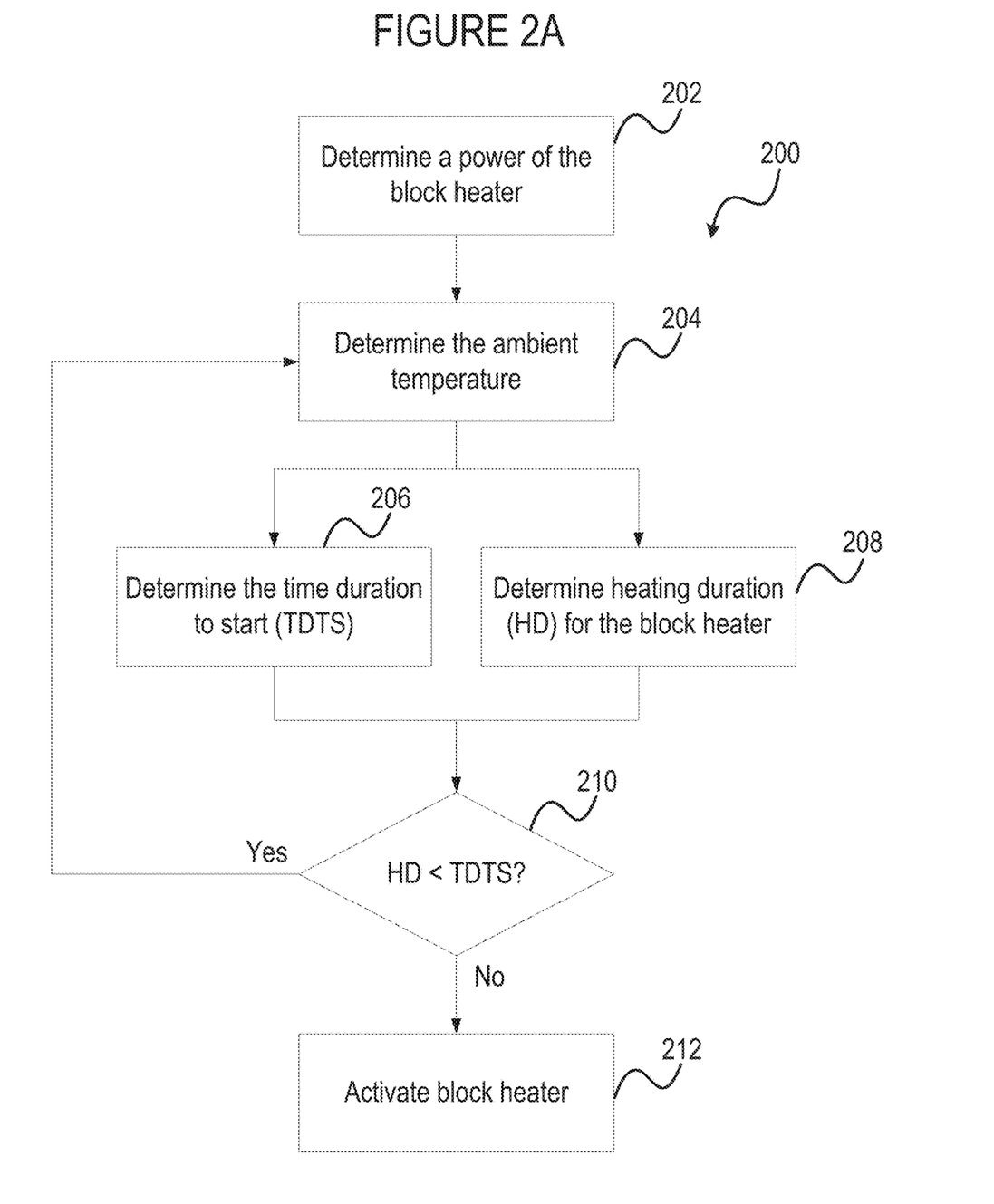
FIG. 2A is a logic flow diagram of the process of controlling a block heater as executed by the controller, according to one or more aspects of this disclosure.

FIG. 2A is a logic flow diagram of a process 200 of controlling a block heater 110 as executed by the controller 102, according to one or more aspects of this disclosure. Code for implementing the process 200 can be stored as software instructions in the memory 118 that are executed by the controller 102. In the following description of the process 200, reference should also be made to FIG. 1A. The process 200 executed by the controller 102 includes determining, at step 202, the power of the block heater 110. The power (e.g., wattage) output of the block heater 110 corresponds to its heat output. In one aspect, the process 200 determines, at step 202, the power output of the block heater 110 by retrieving a stored value associated with the particular block heater 110 that is either input by a user (e.g., via the user interface) or automatically detected by the system when the vehicle is connected to the relay assembly 104. In one aspect, the identity of the vehicle 114 corresponds to the port of the relay assembly 104 to which the vehicle 114 is connected. The power output of the block heater 110 can be stored as a value in, e.g., a look-up table in the memory 118 of the system 100. In another aspect, the process 200 can be configured to detect the power required by the block heater 110 by generating an electrical pulse or ping that is transmitted from the power source 108 through the relay assembly 104 to the block heater 110 electrically connected thereto. The resulting current from the ping can be sensed by, e.g., a current sensing circuit, and then used to calculate the power drawn by the block heater 110. As power is related to voltage and current in a known manner, the power drawn by the block heater 110 can be calculated because the ping is generated at a known voltage (e.g., 120 V) and the resulting current can be sensed or determined.

The process 200 executed by the controller 102 further determines, at step 204, the ambient temperature of the engine's environment. In one aspect, the ambient temperature is determined based on data from the temperature sensor 106, as described above. The temperature sensor 106 can be positioned in close proximity to the vehicle 114 that is connected to the relay assembly 104 such that the temperature determined by the temperature sensor 106 is substantially equal to the temperature of the environment in which the vehicle 114 (and its engine 112) resides. As long as the vehicle 114 has not been used recently, the ambient or environmental temperature will be equal or substantially equal to the temperature of the engine 112, thereby allowing the ambient temperature detected by the temperature sensor 106 to serve as a proxy for the temperature of the engine 112 of the vehicle 114. The process 200 thus obviates the need to directly detect the temperature of the engine 112, reducing the number of components required to be physically associated with or otherwise communicatively coupled to the vehicle 114.

The process 200 executed by the controller 102 further determines, at step 206, the time duration until the desired start time of the vehicle 114 (i.e., time duration to start). In one aspect, the process 200 determines the time duration based on the time difference between the current time and the desired start time for the engine 112. In various embodiments, there is a global or system-wide scheduled desired start time that is stored in, e.g., the memory 118. In another aspect, there can be individual desired start times for each particular vehicle 114 that are stored in, e.g., the memory 118. Such aspects of the system can be useful in order to, e.g., set a unique start time for each vehicle. In yet another aspect, the desired start times (whether global or on an individual vehicle basis) can be based on and vary by the day of the week. In such an embodiment, the controller 102 can determine the day of the week via the timer 116 or a separate system clock (e.g., a clock generator), retrieve the scheduled start time corresponding to both the vehicle 114 and the determined day of the week, and then calculate the difference between the scheduled start time of the particular vehicle 114 for the particular day and the current time. In this aspect, the system 100 can be configured to store unique start times for each day of the week for each vehicle 114. Such aspects of the system 100 can be useful in order to, e.g., have the system 100 not activate a connected block heater 110 on certain days (e.g., weekends) or have the system 100 activate a connected block heater 110 at different times on different days. In some aspects, the identity of the vehicle 114 utilized to retrieve the appropriate start time corresponds to the particular port of the relay assembly 104 to which the vehicle 114 is connected. In other words, the system 100 can be configured to store certain parameters (e.g., a scheduled start time or engine size) in association with a specific port, rather than a particular detectable identity of the vehicle 114 itself. In still other aspects, the identity of the vehicle 114 utilized to retrieve the appropriate start time is input by a user via, e.g., the user interface 120. In such aspects, a user can input particular parameters to be stored in association with a vehicle 114 (or block heater 110 or other device) connected to a particular port of the relay assembly 104 or retrieve previously input stored parameters associated with a vehicle 114 via the user interface 120.

Figure 3:
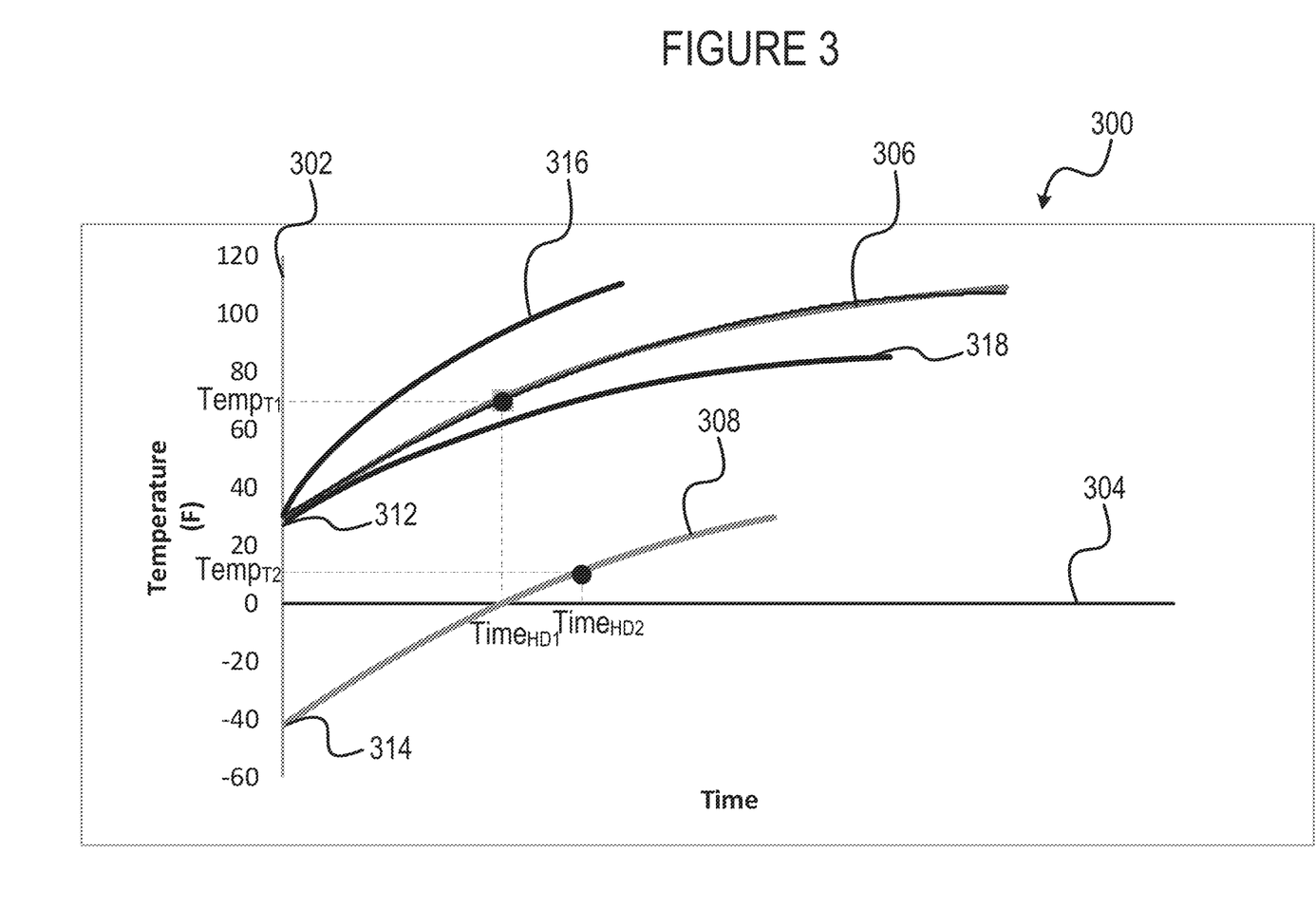
FIG. 3 is a diagram plotting engine temperature as a function of time, according to one or more aspects of this disclosure.

The process 200 executed by the controller 102 further determines, at step 208, the duration of time required by the block heater 110 to heat the engine 112 to a desired engine starting temperature. The amount of time required by the block heater 110 to heat the engine 112 to the desired starting temperature is a function of the engine's initial temperature (detected at step 204), the thermal properties of the engine 112 (which are dictated generally by the size of the engine 112, often expressed in terms of, e.g., liters), the power or size of the block heater 110 (in terms of, e.g., wattage), and of course the desired engine starting temperature. In some aspects, the system 100 is configured to automatically detect the power or size of the block heater 110, as described above. In other aspects, the power or size of the block heater 110 is input by the user (e.g., via the user interface 120) and stored in the memory 118 for subsequent retrieval by the controller 102. The relationship between the variables to calculate the heating duration can be stored as algorithms executed by the processor performing run-time calculations, a series of discrete values in a look-up table, a linear or nonlinear best curve fit formula based on the characterization data, or any other such format. FIG. 3, for example, is a diagram 300 plotting engine temperature 302 (y axis) as a function of time 304 (x axis), according to one or more aspects of this disclosure. In this aspect, the curves 306, 308 depicted in the diagram 300 can be outputs from algorithms representing best-fit curves calculated from characterization or experimental data relating the change in engine temperature over time for various initial temperatures 312, 314, engines sizes, and block heater power levels.

A first curve 306 represents the change in engine temperature 302 over time 304 given a first initial temperature 312, an engine size (e.g., 15 L), and a block heater power level (e.g., 1500 V. A second curve 308 represents the change in engine temperature 302 over time 304 given a second initial temperature 314, an engine size (e.g., 15 L), and a block heater power level (e.g., 1500 V. The sizes of the engines 112 and the powers of the block heaters 110 can be the same or different for each of the curves 306, 308. Engines 112 of different sizes and block heaters 110 with different powers will have different thermal properties and will thus affect the shapes of the curves 306, 308. For example, a third curve 316 represents the first curve 306 wherein all of the variables are held constant except the engine size, which is lower (e.g., 10 L). Lowering the engine size generally increases the rate of temperature increase because, in part, smaller engines have smaller surface areas and thus lose less heat to convection. As another example, a fourth curve 318 represents the first curve 306 wherein all of the variables are held constant except the block heater power, which is lower (e.g., 1200 V. Lowering the power of the engine generally decrease the rate of temperature increase because it lowers the amount of energy being transferred to the engine block.

In one aspect, the process 200 can calculate a heating duration required to reach a particular target temperature by retrieving the particular curve corresponding to the given initial temperature, engine size, and block heater power. For example, if the ambient temperature and properties of the engine 112 and the block heater 110 correspond to the first curve 306, the controller 102 causes the system 100 to retrieve the first curve 306 (or the algorithm representing the first curve 306) and then calculates a heating duration $Time_{HD1}$ required to reach the given target temperature $Temp_{T1}$. Alternatively, if the ambient temperature and properties of the engine 112 and the block heater 110 correspond to the second curve 308, the controller 102 causes the system 100 to retrieve the second curve 308 (or the algorithm representing the second curve 308) and then calculates a heating duration $Time_{HD2}$ required to reach the given target temperature $Temp_{T2}$. Note that the controller 102 can assume that the initial temperature of the engine 112 is equal to the ambient temperature detected via the temperature sensor 106 at step 204. As such, the initial temperature 312, 314 utilized by the algorithm or algorithms can be the ambient temperatures determined at step 204. The curves 306, 308, 316, 318 depicted in FIG. 3 are merely illustrative of the principles discussed herein and the system 100 can include any number of curves and/or algorithms representing the thermal properties of any combination of types of engines 112 and block heaters 110 from any initial temperature.

In another aspect, the process 200 calculates the heating duration utilizing an iterative calculation, rather than retrieving an algorithm corresponding to a best-fit curve. In this aspect, the process 200 performs a heat transfer calculation given the block heater power, the size of the engine 112 (which corresponds to the surface area), and the known specific heat of the engine block. The time component of the heat transfer calculation is a set value (e.g., ten minutes). The process 200 then iteratively calculates the temperature change with the starting temperature as the initial input and each output temperature as the input for the corresponding iteration until the target temperature is reached. Each iteration calculates the bulk heat transfer by the block heater 110 to the engine block, less the convective heat loss to the surrounding environment. Because the time component of the heat transfer equations is a known, set value, the number of iterations that the process 200 had to execute to reach the target temperature corresponds to the heating duration. For example, if the time component is ten minutes and the calculation requires thirty iterations to reach the target temperature, then the heating duration is estimates by the calculations to be three hundred minutes. In addition to the two described aspects, various other processes for calculating the heating duration can be utilized.

In another aspect, the calculations to determine the heating duration at step 208 can incorporate the altitude at which the engine 112 and block heater 110 are located as an additional variable. The altitude can be either input by the user or detected by an altitude sensor communicatively coupled to the controller 102. In these aspects, the process 200 would retrieve a best fit line corresponding to the detected or input altitude, in addition to the starting temperature, block heater power, and engine size. For aspects of the process 200 utilizing an iterative calculation, the altitude can affect the convective heat loss term in the equations and can therefore be incorporated into the calculations.

Referring again to FIG. 2A, the process 200 executed by the controller 102 further compares, at step 210, the calculated heating duration (determined at step 208) to the time duration to start (determined at step 206). If the heating duration is less than the time duration to start (i.e., if activated at the current time, the block heater 110 would heat up the engine 112 to the target temperature prior to the scheduled start time), then the process 200 loops back to re-determine, at step 204, the ambient temperature and continues as described above. In some aspects, step 210 modifies the heating duration or the time duration to start by a margin threshold. In such aspects, if the heating duration is less than the time duration to start by a margin threshold (e.g., two minutes), such that the block heater 110 would heat up the engine 112 to the target temperature prior to the scheduled start time by more than the margin threshold, then the process 200 loops back to step 204. In some aspects, the process 200 incorporates a time delay prior to looping back to step 204. The time delay can be on the order of, e.g., seconds or minutes. In one specific aspect, the time delay is 30 seconds. The time delay can be implemented to conserve the processing power of the system 100 because environmental temperature generally rises relatively slowly and thus does not require continuous monitoring at the processing speeds at which computers are strictly capable of running. If the heating duration is greater than or otherwise within the margin threshold of the time duration to start, then the process 200 as executed by the controller 102 activates, at step 212, the block heater 110 by controlling (e.g., closing) the relay assembly 104 to operably connect the power source 108 to the block heater 110. Once the block heater 110 receives power from the power source 108 through the relay assembly 104, the block heater 110 begins heating the engine 112.

Figure 2B:
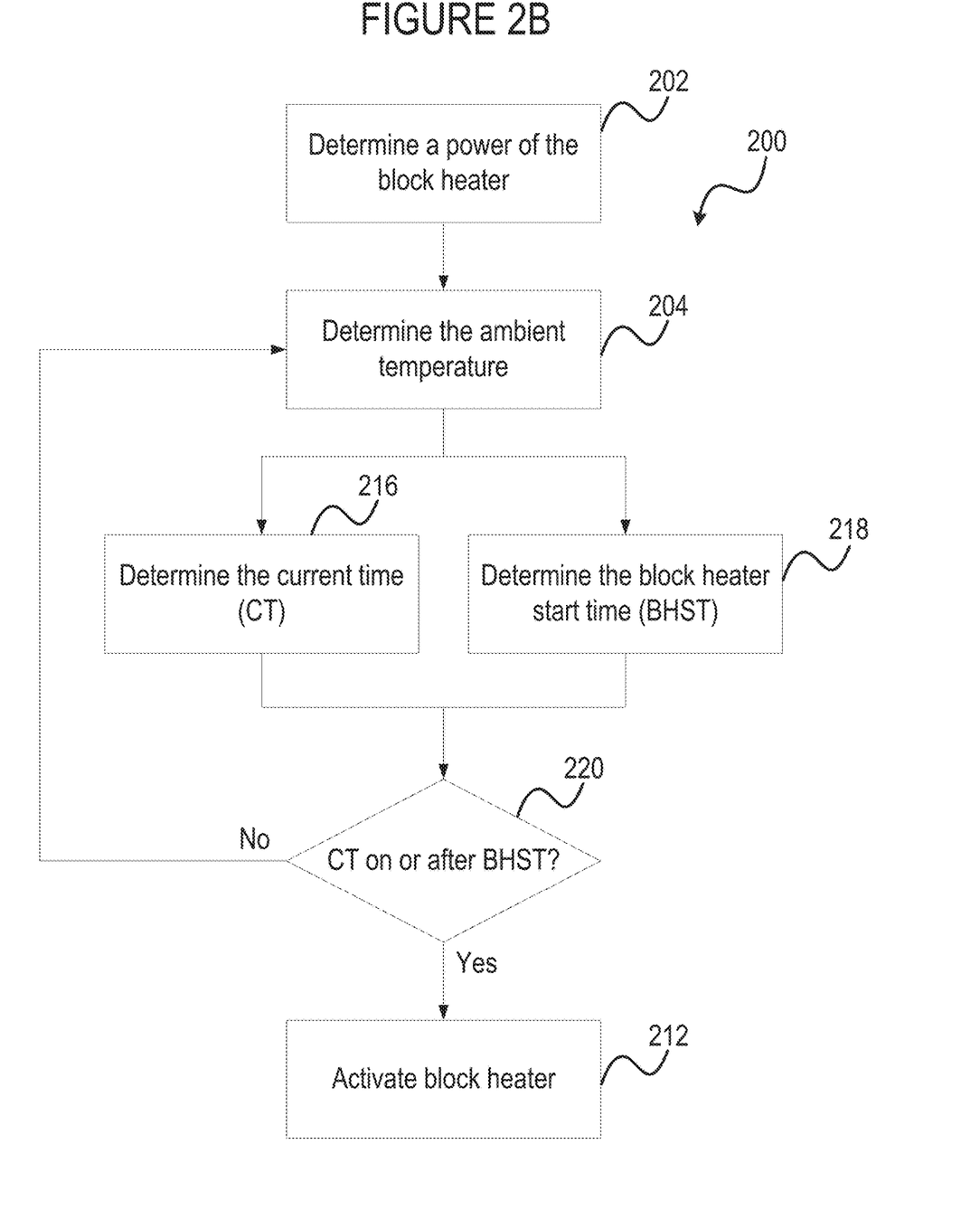
FIG. 2B is a logic flow diagram of the process of controlling a block heater as executed by the controller, according to one or more aspects of this disclosure.

FIG. 2B is an logic flow diagram of an alternative aspect of the process 200 of controlling a block heater 110 as executed by the controller 102, according to one or more aspects of this disclosure. This aspect of the process 200 of controlling a block heater 110 determines, at step 202, a power of the block heater 110 and determines, at step 204, the ambient temperature, as described above with respect to FIG. 2A. However, in this aspect the process 200 then determines, at step 216, the current time by, e.g., retrieving a state or output from the timer 116. The process 200 further determines, at step 218, the block heater start time corresponding to the time at which the block heater 110 must start in order to heat the engine 112 to the target temperature by the target time. The block heater start time can be determined by calculating the heating duration (as described above with respect to FIG. 2A) of the block heater 110 and then subtracting the heating duration from the target time (which can be retrieved from, e.g., the memory 108).

The process 200 then compares, at step 220, the current time (determined at step 216) to the block heater start time (determined at step 218). If the current time is on or after the block heater start time, then the process 200 activates the block heater 110. If the current time is not on or after the block heater start time, then the process 200 loops back to re-determine, at step 204, the ambient temperature and continues as described above. In some aspects, the process 200 incorporates a time delay prior to returning to determining the ambient temperature, as described above with respect to FIG. 2A.

Figure 4:
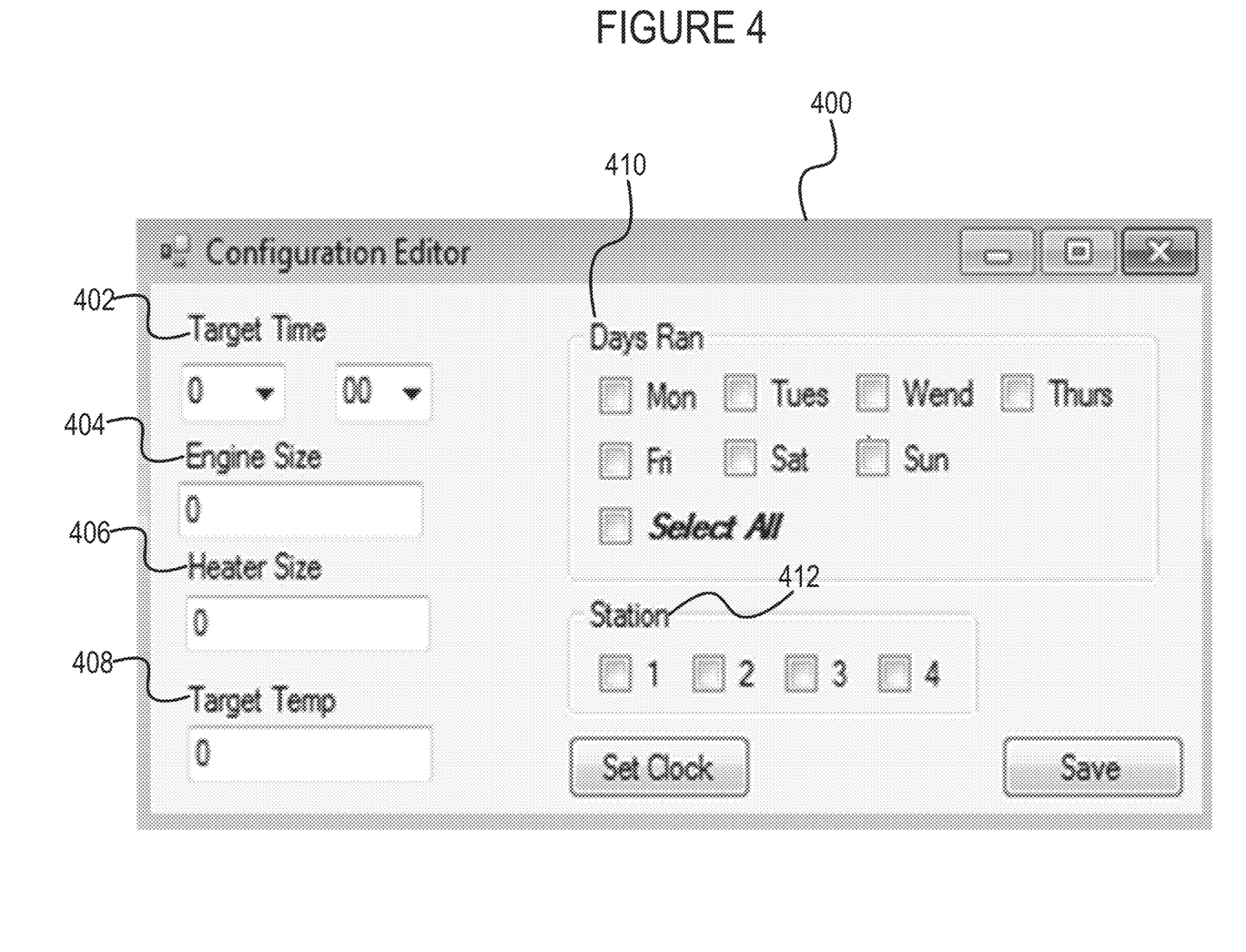
FIG. 4 is a graphical user interface for the system, according to one or more aspects of this disclosure.

FIG. 4 is a graphical user interface (GUI) 400 for the system 100, according to one or more aspects of this disclosure. In the following description of the GUI 400, reference should also be made to FIG. 1A. In some aspects, the user interface 120 of the system can include a GUI 400. In various aspects, the GUI 400 can include a target time selection 402 for setting a time at which the user wants the vehicle 114 to be scheduled to be ready (i.e., the target time), an engine size selection 404 for setting the size of the engine 112 (in, e.g., liters), a block heater size selection 406 for setting the size or power output of the block heater 110 (in, e.g., watts), and a target temperature selection 408 for setting a temperature to which the engine 112 is to be heated by the block heater 110 (in, e.g., degrees Fahrenheit). In some aspects, the power output of the block heater 110 is determined automatically by the system 100, rather than being manually input by a user through the GUI 400. In some aspects, the GUI 400 further includes a calendar or day selection 410 for selecting the particular day or days of the week that the system 100 is configured to activate the particular block heater 110. In other aspects, the GUI 400 further includes a month selection for selecting the particular months of the year that the system 100 is configured to activate the block heater 110. In still other aspects, the GUI 400 further includes a target time selection 402 for each of the days and/or months provided by the day selection 410.

In summary, the aspects depicted in FIGS. 2A and 2B both represent processes for controlling the relay assembly 104 to electrically connect the power source 108 to the block heater 110 to activate the block heater 110 according to the heating duration and a target time, such that the engine 112 reaches the target temperature at approximately the target time, without activating the block heater 110 overly early and thereby wasting energy. The processes depicted in FIGS. 2A and 2B essentially differ in that one compares time durations (FIG. 2A) and the other compares times themselves (FIG. 2B). Various other methods of controlling the relay assembly 104 to electrically connect the power source 108 to the block heater 110, such that the block heater 110 is energized to heat the engine 112 according to the calculated heating duration and a target time, can be utilized.

In some cases, it can be impossible to reach a target temperature given a certain starting temperature, block heater power, engine size, and other such conditions. For example, the second curve 308 depicted in FIG. 3 indicates that it would either take a long period of time or be impossible to ever reach a target temperature of 70° F. given a starting temperature of −40° F. for these particular conditions. To address this, the process 200 can be configured to put the heating duration to a set value (e.g., 12 hours) if the process 200 calculates that the heating duration would exceed a threshold value or the temperature of the engine 112 would never reach the target temperature. In some aspects, the threshold value can be equal to the set value (e.g., 12 hours). In some aspects, the controller 102 can be configured to calculate the max temperature that could be reached given an input starting temperature, block heater power, and engine size and then refuse to allow a target temperature exceeding a certain threshold relative to the max temperature to be accepted as input via the user interface 120. For example, the controller 102 could cause the user interface 120 to return an error if the user attempted to enter a target temperature exceeding a certain percentage (e.g., 80%) of the calculated maximum temperature given the other input conditions.

In some aspects, the GUI 400 further includes a station selection 412 for selecting the particular station or port of the relay assembly 104 that the various selections are to be stored in relation to. In these aspects, identifying the port or station functionally serves the purpose of identifying the particular vehicle 114. Such aspects of the system 100 can be utilized in arrangements where, e.g., the same vehicles are consistently connected to the same port of the relay assembly 104 each day. In other aspects, the GUI 400 further includes a vehicle ID selection for inputting a particular unique ID associated with each vehicle. In these aspects, when the user first connects the particular vehicle 114 to the system, the user inputs the particular station where the vehicle 114 is connected via the station selection 412 and the vehicle ID. The system 100 then stores the various selections made via the GUI 400 in association with the vehicle ID. When the vehicle 114 is subsequently connected to the system 100, the user can input the particular vehicle ID and the system 100 will automatically retrieve the stored variables associated with the vehicle ID (e.g., engine size, target time, schedule, target temperature, and/or heater power) and begin executing the process 200 (FIGS. 2A, 2B) for controlling the block heater 110 according to these stored variables. All of the various selections through the GUI 400 can be stored in the memory 118 for subsequent retrieval by the logic, process, or instructions executed by the controller 102.

Figure 5:
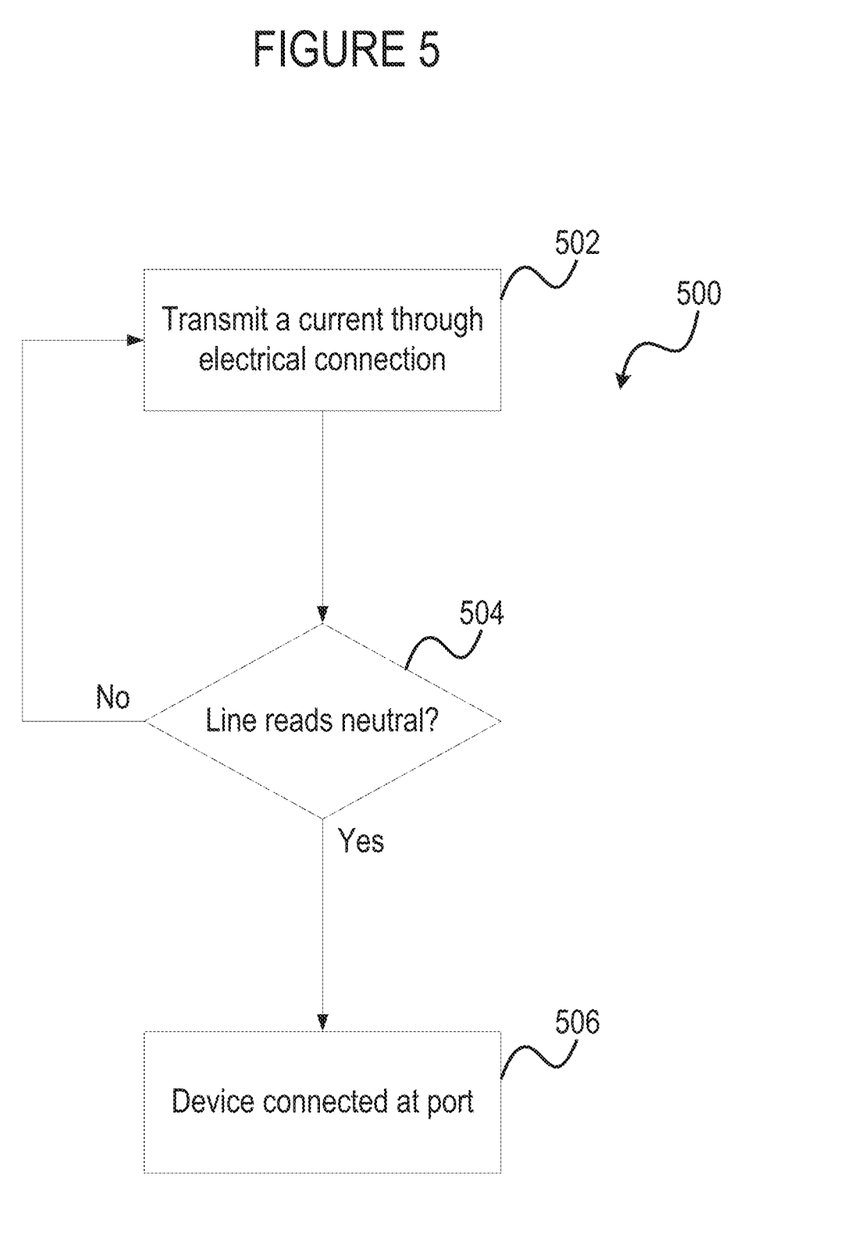
FIG. 5 is a logic flow diagram of the process of detecting the connection of a block heater as executed by the controller, according to one or more aspects of this disclosure.

FIG. 5 is a logic flow diagram of the process 500 of detecting the connection of a block heater 110 as executed by the controller 102, according to one or more aspects of this disclosure. In the following description of the process 500, reference should also be made to FIG. 1A. The process 500 transmits, at step 502, an electrical current through the electrical connection 122 that is configured to couple a block heater 110 to the relay assembly 104. The transmitted current can be a relatively small current, e.g., 2 mA. The process 500 then determines, at step 504, whether the electrical connection 122 reads as line voltage or as neutral via a circuit. If a block heater 110 is connected to the relay assembly 104 via the electrical connection 122, then the line will read neutral and the process 500 determines, at step 506, that a block heater 110 is connected to the relay assembly 104 at the particular port. If a block heater 110 is not connected to the relay assembly 104, then the line will read line voltage and the process 500 can loop to re-transmit, at step 502, an electrical current in order to continuously monitor whether a block heater 110 is connected to the relay assembly 104.

When it is determined, at step 506, that a block heater 110 is connected at a port of the relay assembly 104, the system 100 can take a variety of actions, such as automatically initiating the process 200 (FIGS. 2A, 2B) of controlling the block heater 110. In such embodiments, the variables such as engine size, target temperature, and activation schedule can be assigned to a particular port so that when the system 100 detects that a block heater 110 has been connected to the relay assembly 104 at the particular port, the system 100 can automatically execute the process 200 of controlling the block heater 110 according to the target time (as determined in some cases by an activation schedule), engine size, and other variables stored in association with the particular port. In other aspects, when it is determined, at step 506, that a block heater 110 is connected at a port of the relay assembly 104, the system 100 causes the user interface 120 to automatically display a GUI 400 (e.g., FIG. 4) in order to prompt the user to enter the information necessary to execute the process 200 of controlling the block heater 110 for preheating the vehicle 114, such as a vehicle ID or the variables required for the computations of the process 200 of controlling the block heater 110.

The process 500 can further include a step of detecting whether the current transmitted through the electrical connection 122 is above a threshold or minimum level. If the current is below the threshold, then the process 500 can flag the occurrence of the low current. When the flag is detected by the controller 102, the controller 102 can cause the user interface 120 to display an alert indicating that there is a potential error in the detection of the connection of a block heater 110 so that a user can take corrective action.

Figure 6:
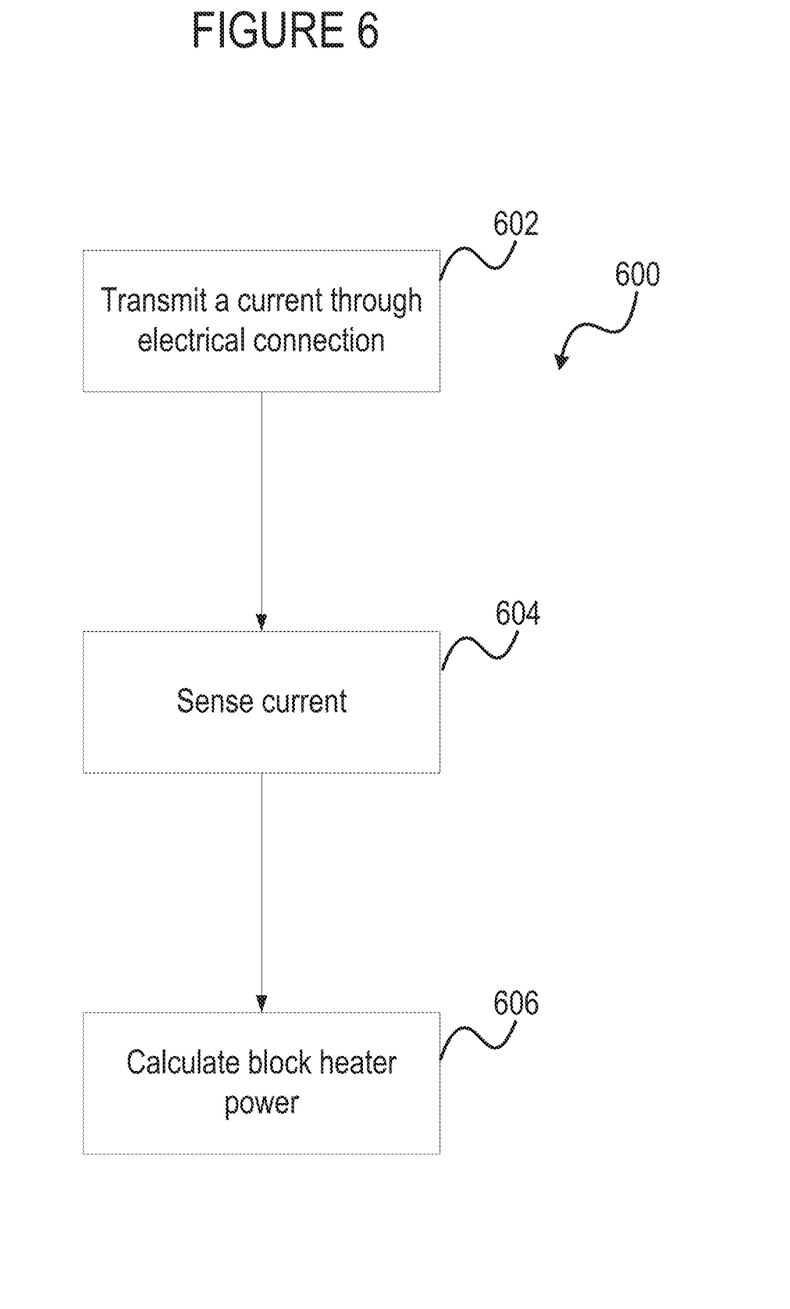
FIG. 6 is a logic flow diagram of the process of detecting the power of a block heater as executed by the controller, according to one or more aspects of this disclosure.

FIG. 6 is a logic flow diagram of the process 500 of detecting the connection of a block heater 110 as executed by the controller 102, according to one or more aspects of this disclosure. In the following description of the process 500, reference should also be made to FIG. 1A. The process 600 transmits, at step 602, a current through the electrical connection to a block heater 110. The process 600 next, at step 604, senses the resulting current from the transmission by, e.g., a current sensing circuit. The process 600 next, at step 606, calculates the power drawn by the block heater 110 according to the known voltage at which the transmission was generated and the sensed resulting current from the block heater 110. By automatically detecting the power of the block heater 110, the system 100 can obviate the need for the user to manually enter this value through, e.g., the GUI (FIG. 4).

When a component is described as being "communicatively coupled" to one or more other components, the components are coupled such that they are able to send and/or receive signals therebetween, the signals being capable of transmitting information for processing by any of the connected components or a separate component. Unless stated otherwise, components can be communicatively coupled via either wired or wireless connections. Furthermore, such connections can be configured to transmit analog signals, digital signals, or any type of signal electrically, electronically, or via any other such means. When a component is described as being "operably coupled" to one or more other components, the components are coupled such that there is a functional relationship between the components, i.e., the components are connected in a manner such that they perform the designated function.

Parts of this disclosure may be presented in terms of instructions that operate on data stored in a computer memory. An algorithm or process refers to a self-consistent sequence of steps leading to a desired result, where a "step" refers to a manipulation of physical quantities which may take the form of electrical or magnetic signals capable of being stored, transferred, combined, compared, and otherwise manipulated. These signals may be referred to as bits, values, elements, symbols, characters, terms, numbers. These and similar terms may be associated with the appropriate physical quantities and are merely convenient labels applied to these quantities.

The foregoing description has set forth aspects of devices and/or processes via the use of block diagrams, flowcharts, and/or examples, which may contain one or more functions and/or operations. Each function and/or operation within such block diagrams, flowcharts, or examples can be implemented, individually and/or collectively, by a wide range of hardware, software, firmware, or virtually any combination thereof. In one aspect, several portions of the subject matter described herein, such as the controller, may be implemented via Application Specific Integrated Circuits (ASICs), Field Programmable Gate Arrays (FPGAs), digital signal processors (DSPs), Programmable Logic Devices (PLDs), circuits, registers, software components (e.g., programs, subroutines, or logic), and/or combinations of hardware and software components, logic gates, or other integrated formats. Some aspects disclosed herein, in whole or in part, can be equivalently implemented in integrated circuits, as one or more computer programs running on one or more computers (e.g., as one or more programs running on one or more computer systems), as one or more programs being executed by one or more processors (e.g., as one or more programs running on one or more microprocessors), as firmware, or as virtually any combination thereof. Designing the circuitry and/or writing the code for the software and or firmware would be well within the skill of one of skill in the art in light of this disclosure.

Although various aspects have been described herein, many modifications and variations to those aspects may be implemented. Also, where materials are disclosed for certain components, other materials may be used. The foregoing description and following claims are intended to cover all such modification and variations.

The invention claimed is:

1. A system for pre-start heating of an engine by a heating element, the system comprising:
   a network server configured to host a graphical user interface;
   a computing device communicably coupled to the network server, wherein the computing device is configured to run the graphical user interface;
   the graphical user interface is configured to receive heating element control inputs of a target temperature and a target time at which the engine is to be heated to the target temperature; and
   a controller operably connected to the network server through a wireless network, wherein the controller is programmed to:
     determine an ambient temperature indicative of a temperature of the engine based on a temperature sensor;
     determine a heating duration for the heating element, the heating duration corresponding to a length of time required by the heating element to heat the engine from the ambient temperature to the target temperature, wherein the heating duration is determined based at least in part on the power of the heating element;
     determine whether the target temperature is reachable by the target time based on the determined heating duration;
     provide feedback via the graphical user interface in response to a determination that the target temperature is not reachable by the target time without activating or operating the heating element; and
     upon a determination that the target temperature is reachable by the target time, activate the heating element according to the heating duration and the target time, such that the engine does not reach the target temperature prior to the target time.

2. The system of claim 1, wherein the controller is programmed to:
   determine a time duration to start corresponding to a difference between a current time and a target time;
   compare the heating duration to the time duration to start; and
   activate the heating element in response to the heating duration being greater than or equal to the time duration to start.

3. The system of claim 1, wherein the controller is programmed to:
   determine a heating element start time corresponding to the target time less the heating duration;
   compare a current time to the heating element start time; and
   activate the heating element in response to the current time being on or after the heating element start time.

4. The system of claim 1, wherein the controller is programmed to determine the heating duration based additionally on a size of the engine.

5. The system of claim 4, further comprising:
   a memory that stores data for a plurality of curves, wherein each of the plurality of curves provides a relationship between heating duration and temperature change for a given combination of the power of the heating element and the size of the engine;
   wherein the controller is programmed to determine the heating duration based on a curve of the plurality of curves that best fits the determined ambient temperature, the target temperature, the size of the engine to be heated, and the power of the heating element.

6. The system of claim 1, wherein the target time is associated with a weekday.

7. The system of claim 1, wherein:
   the controller is communicably connectable to a plurality of heating elements; and
   the controller is programmed to:
     determine the power of each the plurality of heating elements;
     determine the heating duration for each of the plurality of heating elements; and
     activate each of the plurality of heating elements according to the heating duration and the target time, such that the engine to which each of the plurality of heating elements is coupled does not reach the target temperature prior to the target time.

8. The system of claim 1, wherein the controller is programmed to determine the heating duration based on iterative heat transfer calculations, wherein at each iteration the controller calculates a bulk heat transfer by the heating element to the engine over an iteration time period.

9. A method for pre-start heating of an engine by a heating element, wherein the heating element is communicably coupled, via a wireless network, to a network server, and wherein the network server is configured to host a graphical user interface, the method comprising:
   in a first iteration:
     receiving a first target temperature and a first target time at which the engine is to be heated to the first target temperature via the graphical user interface;
     determining a first ambient temperature indicative of a first temperature of the engine based on a temperature sensor;
     determining a first heating duration for the heating element, the first heating duration corresponding to a length of time required by the heating element to heat the engine from the first ambient temperature to the first target temperature, wherein the first heating duration is determined based at least in part on the power of the heating element;

determining whether the first target temperature is reachable by the first target time according to the first determined heating duration;

providing feedback via the graphical user interface in response to a determination that the first target temperature is not reachable by the first target time; and in a second iteration:

receiving a second target temperature and a second target time at which the engine is to be heated to the second target temperature via the graphical user interface;

determining a second ambient temperature indicative of a second temperature of the engine based on the temperature sensor;

determining a second heating duration for the heating element, the second heating duration corresponding to a length of time required by the heating element to heat the engine from the second ambient temperature to the second target temperature, wherein the second heating duration is determined based at least in part on the power of the heating element;

determining whether the second target temperature is reachable by the second target time according to the second determined heating duration; and activating, upon a determination that the second target temperature is reachable by the second target time, the heating element according to the second heating duration and the second target time, such that the engine does not reach the second target temperature prior to the second target time.

10. The method of claim 9, the method further comprising:

determining a time duration to start corresponding to a difference between a current time and the second target time;

comparing the second heating duration to the time duration to start; and activating the heating element in response to the second heating duration being greater than or equal to the time duration to start.

11. The method of claim 9, the method further comprising:

determining a heating element start time corresponding to the second target time less the second heating duration;

comparing a current time to the heating element start time; and activating the heating element in response to the current time being on or after the heating element start time.

12. The method of claim 9, wherein the first heating duration and the second heating duration is determined based additionally on a size of the engine.

13. The method of claim 12, further comprising:

storing data for a plurality of curves, wherein each of the plurality of curves provides a relationship between the first and second heating duration and temperature change for a given combination of the power of the heating element and the size of the engine;

wherein the first and second heating duration is determined based on a curve of the plurality of curves that best fits the determined ambient temperature, the target temperature, the size of the engine to be heated, and the power of the heating element.

* * * * *